(12) United States Patent
Clarke

(10) Patent No.: US 8,580,414 B2
(45) Date of Patent: Nov. 12, 2013

(54) MICRO GAP FLOW THROUGH ELECTROCHEMICAL DEVICES WITH SELF ADJUSTING REACTIVE SURFACES

(76) Inventor: Richard Clarke, Orinda, CA (US)

( * ) Notice: Subject to any disclaimer, the term of this patent is extended or adjusted under 35 U.S.C. 154(b) by 686 days.

(21) Appl. No.: 12/514,487

(22) PCT Filed: Nov. 14, 2007

(86) PCT No.: PCT/US2007/023992
§ 371 (c)(1),
(2), (4) Date: Oct. 27, 2010

(87) PCT Pub. No.: WO2008/133655
PCT Pub. Date: Nov. 6, 2008

(65) Prior Publication Data
US 2011/0033760 A1    Feb. 10, 2011

Related U.S. Application Data

(60) Provisional application No. 60/859,036, filed on Nov. 14, 2006.

(51) Int. Cl.
*H01M 2/38*    (2006.01)
*H01M 8/04*    (2006.01)
*H01M 4/36*    (2006.01)
*C25B 9/04*    (2006.01)

(52) U.S. Cl.
USPC ........... 429/51; 429/105; 429/428; 204/230.2

(58) Field of Classification Search
None
See application file for complete search history.

(56) References Cited

U.S. PATENT DOCUMENTS

| | | |
|---|---|---|
| 6,572,743 B2 | 6/2003 | Miller et al. |
| 6,773,571 B1 * | 8/2004 | Mayer et al. .................... 205/96 |
| 2005/0084737 A1 * | 4/2005 | Wine et al. ....................... 429/38 |
| 2006/0092599 A1 * | 5/2006 | Yamamura et al. ........... 361/611 |

* cited by examiner

*Primary Examiner* — Ula C Ruddock
*Assistant Examiner* — Matthew Van Oudenaren
(74) *Attorney, Agent, or Firm* — Fish & Associates, PC

(57) ABSTRACT

Contemplated electrochemical devices and methods include an electrolyte flow path in which substantially all of the electrolyte has laminar flow. A segmented electrode contacts the electrolyte, and each of the segments in the segmented electrode is preferably coupled to a control device to provide control over the flow of current to and/or from the electrolyte. Thus, it should be appreciated that the redox state of the electrolyte can be changed in a single-pass through the flow path, which effectively eliminates problems associated with mass transport phenomena and reduced current efficiency.

20 Claims, 3 Drawing Sheets

MICRO GAP FLOW THROUGH ELECTROCHEMICAL DEVICES WITH SELF ADJUSTING REACTIVE SURFACES

This application claims priority to our U.S. provisional patent application with the Ser. No. 60/859,036, filed Nov. 14, 2006, and which is incorporated by reference herein.

FIELD OF THE INVENTION

The field of the invention is electrochemical devices and methods therefor.

BACKGROUND OF THE INVENTION

Numerous electrochemical processes are widely used, and examples include electric storage batteries, production of basic raw materials (e.g., aluminum, chlorine, caustic soda, titanium, hydrogen, etc.). More recently, electrochemical devices are also used in medical devices to monitor blood sugar, drugs, or help analyze DNA. Thus, and depending on the type of use, electrochemical devices may considerably vary in size and overall design.

Remarkably, despite the enormous variety of electrochemical devices, the electrodes and their configurations substantially remained the same. Among other factors, the common thread in electrochemical processes and processing is that they take place by the movement of ions or electronically charged species in an electrolyte. Another common feature is the use of electrodes where electrons are transferred in and out of the electrolyte, which can be a liquid, a molten salt, or even a gelled or solid solution. During an electrochemical reaction it should be noted that electrons, the charge carriers, move through electrodes at the speed of light, whereas ions, the carriers of electrons through the electrolyte occur at much lower speeds, millimeters per second at best. Consequently, the rate of reaction is predominantly controlled by the ability of ions to participate in the reactions at the electrode/electrolyte interface. Therefore, the availability of the surface and the concentration of the reactive species at that surface are fundamentally important. The parameters that govern reaction rates at electrode interfaces include the rate that reactants reach the electrode, and the rate at which products diffuse back into the bulk of the electrolyte. These parameters are further compounded by concentration factors of reactants, products, and solute molecules which can slow down the speed at which the reactants make contact with the electrode prior to the fast electron transfer reaction taking place.

The electrolyte layer immediately adjacent to the electrode surface is generally known as the Nernst diffusion layer, and it is assumed that mixing in this layer between and the bulk of the solution is subject to Fick's law of diffusion. Many different equations are based on these considerations and have been employed to explain the kinetics and rates of reaction for various situations. Notably, it is generally accepted that dispersion of the Nernst diffusion layer by shear or turbulent flow will increase reaction rates. In common practice and for most of the electrochemical reactions, this theory holds true.

Reaction rates in most conventional electrochemical reactions (e.g., electrosynthesis, large scale electrolyzers for metal winning, water sterilization, batteries, fuel cells, etc.) are typically controlled by current and limited by mass transfer. Therefore, many electrochemists and engineers attempt to improve electrochemical reaction kinetics by increasing the flow rate of fluid that passes over an electrode surface to thereby increase sheer stress that is thought to increase mass transfer by mixing. This is often achieved by pumping or stirring, oscillating the electrolyte, or by rotating the electrodes to disperse the electrolyte at the electrode interface. These techniques help to at least some degree to remove or displace the products of the reaction and solvent molecules from the reaction surface allowing greater access for reactant ions. Alternatively, or additionally, the surface area of the electrode may be increased. However, numerous difficulties still remain. Among other things, diminishing returns will arise as reactant concentrations decline, and increasing the size of the electrodes will fairly quickly reach practical limitations.

To analyze in more detail the flow characteristics at the electrode to solve problems associated with large electrodes and flow properties at the electrode surface, electrochemists and chemical engineers have historically assumed that the theoretical treatment of flow in pipes by dimensionless numbers analysis is sufficient to characterize the conditions found in most electrolyzers. The boundary layers that impede electron transfer reactions known as the Nernst diffusion layer may be reduced by creating turbulent flow. Figures of merit are expressed as Reynolds numbers greater than 3000 to describe turbulent flow and below 2000 for laminar with 2000 to 3000 considered the critical or transient flow. However, when cell gaps are less than 1 mm the model fails as the boundary layers collapse on each other and flow equivalent to a gravity fed cell with only tens of cm of head would produce a well mixed thin boundary layer surface by laminar flow alone.

Models used to calculate and study the reaction and electrolyte kinetics are referred to as mass transport phenomena. In order to simplify the mathematics of hydrodynamic or mass transport phenomena, use is made of dimensionless numbers (e.g., Reynold's number, Schmidt number etc.) or ratios of parameters that numerically describe the physical properties of a solution without units. For example, Reynolds number is $\rho v d/\mu$ where $\rho$ is the density, $v$ is the linear velocity, $d$ is the diameter of a pipe, and $\mu$ is the kinematic viscosity. This artificial mathematical modeling often works fairly well in certain systems, but fails as the size of the gap between the walls of the system, d, becomes very small as turbulent flow is restricted and laminar flow is predominant.

Therefore, while numerous configurations and methods of electrochemical devices are known in the art, all or almost all of them suffer from one or more disadvantages, especially where the cell gap is relatively small. Consequently, there is still a need to provide improved composition and methods to improve wear resistance in such products.

SUMMARY OF THE INVENTION

The present invention is directed to devices and methods for electrochemical reactors in which an electrolyte is fed through a flow path that is configured to allow laminar flow of the electrolyte in the flow path. In such devices and methods, the electrolyte is in contact with a segmented electrode, wherein at least some of the segments are electrically coupled to a current control device. Most preferably, the current control devices are configured such that current can be delivered to the electrolyte in predetermined positions in a controlled fashion.

In one aspect of the inventive subject matter, an electrochemical device includes an electrolyte conduit that is configured such that substantially all of an electrolyte flowing through the conduit has a laminar flow, and further includes a segmented electrode in contact with the electrolyte, wherein at least two of the segments are electronically coupled to at least two respective current control devices. Most typically, the conduit is configured as a linear conduit having a length and a depth, wherein the length-to-depth ratio is at least 10, and the current control devices are a diode, a transistor, and/or an integrated circuit. Moreover, it is preferred that the current control devices are disposed between an electrode surface and a busbar, and where desired, the current control devices are electronically coupled to each other to provide a neighbor bias.

Therefore, it should be appreciated that the electrode is configured to allow control of current to different parts of the flow path. Still further, it is contemplated that the segmented electrode may be configured as a compound electrode such that one of the segments operates as a cathode and another segment operates as an anode. Contemplated devices may further comprise at least one of a transistor, an integrated circuit, and a microprocessor, coupled to control at least one of voltage and current at the at least two of the segments. Moreover, a separator may be included that is configured to define at least part of the electrolyte conduit. In such devices, a second electrolyte conduit may be included that is configured such that substantially all of a second electrolyte flowing through the second conduit has a laminar flow, and a second segmented electrode in contact with the second electrolyte, wherein at least two of the segments of the second segmented electrode are electronically coupled to at least two respective second current control devices. Consequently, devices according to the inventive subject matter may be configured as a primary battery, a secondary battery, a fuel cell, or an electrochemical reactor.

In another aspect of the inventive subject matter, a method of operating an electrochemical device is contemplated in which (1) an electrolyte having a first oxidation state is pumped along a flow path such that substantially all of the electrolyte has laminar flow in the flow path, and in which (2) the first oxidation state of the electrolyte is changed to a second oxidation state on a segmented electrode such that substantially all of the electrolyte has the second oxidation state at a location downstream of the flow path. In such methods, at least two of the segments of the electrode are electronically coupled to at least two respective current control devices (e.g., diode, transistor, integrated circuit, etc.), which are preferably disposed between an electrode surface and a busbar.

In a still further aspect of the inventive subject matter, a method of manufacturing an electrochemical reactor having a first electrolyte reservoir with a first electrolyte at a first oxidation state, a second electrolyte reservoir with the first electrolyte at a second oxidation state, and an electrolytic cell having an anode, a cathode, and a separator between the anode and the cathode, wherein the cell has a flow path that fluidly couples the first and second electrolyte reservoirs, and wherein the flow path allows the first electrolyte to contact the anode, will comprise the steps of (1) forming a length of the flow path such that substantially all of the first electrolyte has a laminar flow, and (2) forming the anode such as to allow change of oxidation state of substantially all of the first electrolyte from the first to the second oxidation state upon traversing the length of the flow path.

Most preferably, the step of forming the anode comprises a step of segmenting the anode into a plurality of segments, and coupling at least two of the segments to at least two respective current control devices (e.g., diode, transistor, integrated circuit, etc.), and the step of forming the length of the flow path comprises forming of a linear conduit having a length and a depth, wherein the length-to-depth ratio is at least 10.

Various objects, features, aspects and advantages of the present invention will become more apparent from the following detailed description of preferred embodiments of the invention, along with the accompanying drawing.

DETAILED DESCRIPTION

Figure 1:
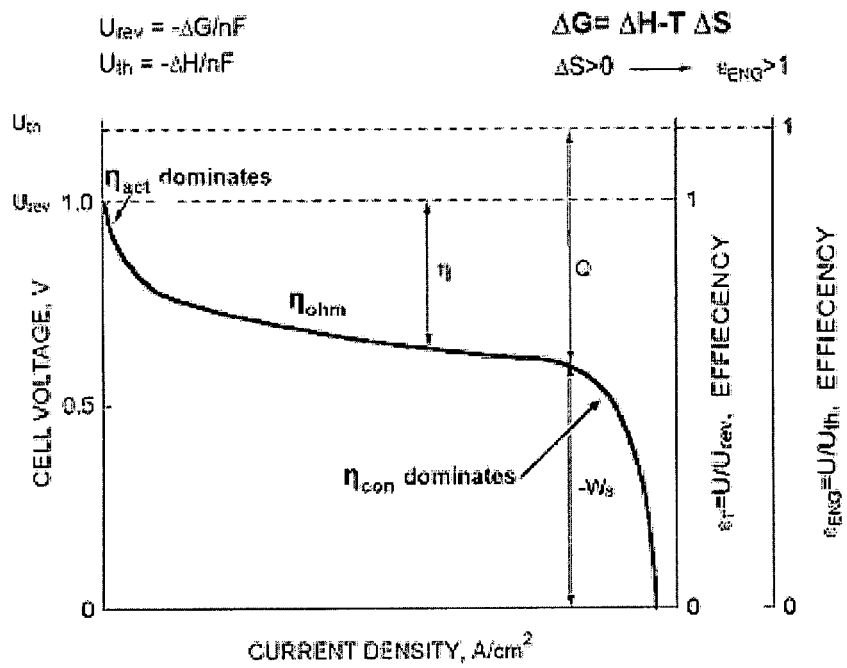
FIG. 1 is a graph depicting exemplary polarization characteristics of a fuel cell with conventional electrodes.

The inventor has discovered that numerous electrochemical devices can be configured in a simple and effective manner in which heretofore known problems associated with mass transport phenomena are substantially eliminated. Contemplated devices and methods will provide substantially improved reaction kinetics and "good-to-the-last-drop" performance of power cells.

Therefore, in one aspect of the inventive subject matter, electrochemical reactors use highly restricted electrolyte pathways in which the boundary layers of laminar flow at the electrode walls begin to touch each other and allow for perfect mixing in a single boundary layer at laminar flow. Viewed from a different perspective, configurations and methods are contemplated in which electrolyte films move through an electrochemical reactor. Therefore, and among other configurations, a one pass reactor is particularly contemplated in which the rate of reaction and completion of reaction are controlled by the electrolyte flow rate and the electrical flux.

For example, a redox flow battery is contemplated in which electrical energy is stored in the electrolyte (e.g., using redox reagents $M^x/M^{x+1}$). In such cases the flowing electrolyte is discharged or charged during its passage along a narrow channel where flowing electrolyte produces power based on demand. It should therefore be appreciated that substantially all (i.e., at least 85%, more typically at least 90%, most typically 95%) of the redox reagents in the electrolyte are consumed in a single pass through the channel during discharge, and on current and flow reversal, substantially all of the electrolyte will issue from the same channel in fully charged form during the charging process.

As the reactive species is depleted during traverse through the cell or completely recharged depending on flow direction and the polarity of the electrodes, the concentration of reagents will change rapidly along the path of the channel. Thus, a common electrical contact would waste current at the depleted end where lowering the current density would be of great advantage in avoiding polarization. To avoid such problem, diodes or other control implements are contemplated to control current density and prevent wasteful reactions. Alternatively, electrical contacts could be segmented and diminishing currents could be applied to the downstream segments in an electronically controlled manner. Therefore, to increase efficiency of devices contemplated herein, the electrodes are preferably segmented and separated from the current collector with diodes or other electrical (preferably directional) flow control elements. Among other advantages associated with use of diodes (or other flow control devices), it should be recognized that in places where the electrolyte is already spent, the electrolyte is no longer a resistor but instead an open circuit. On the other hand, where the electrolytes are performing work, the diodes will be switched on and allow current to pass to the current collector. Thus, it should be appreciated that the diodes isolate the front of the reactor where the voltage and current are high (as the electrolyte is fresh) from the end of the reactor where the voltage and current are low (as the electrolyte is spent). With low pumping rates, only the front of the reactor is converting power and the rear is isolated from the electrical circuit. Such arrangement advantageously prevents the spent electrolyte from acting as a resistor. Upon high pumping rates, the spent reactant front moves toward the rear of the reactor and more electrode sections of the reactor are turned on.

Figure 2:
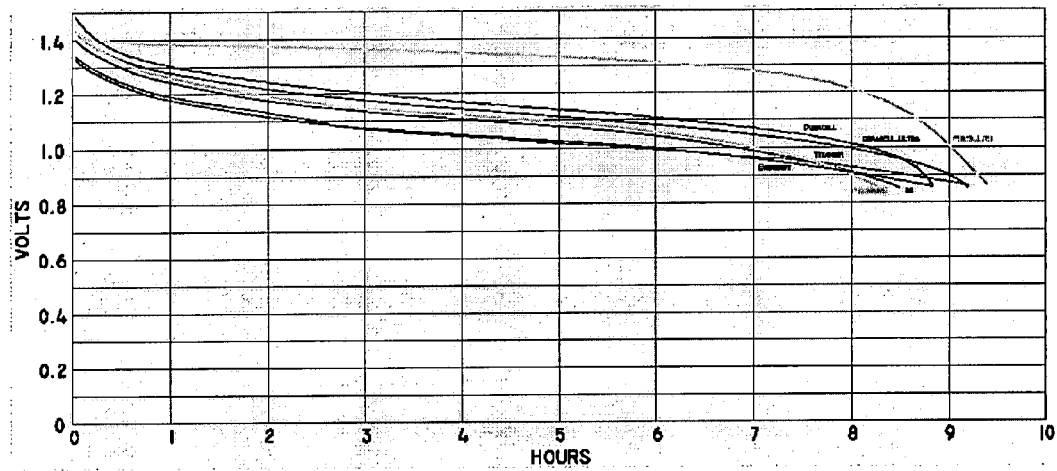
FIG. 2 is a graph depicting exemplary power output curves over time for various known primary batteries with conventional electrodes.

Consequently, fuel cells and flow batteries can now be run to near full utilization of the electrolytes/redox reactants without adding resistance of the spent solutions that would otherwise generate heat in the system. Moreover, it should be realized that flow batteries using configurations and electrodes according to the inventive subject matter can now be run in a demand and/or throttling mode such that the amount of energy released by the cell becomes a function of the mass flow rate of unspent solution sent into the cell, and thus removes the need for complicated electronic control by pulse width modulation. It should be particularly noted that devices and methods according to the inventive subject matter have significant advantages. Among other things, the power will be constant as the state of charge of the fuel is a constant since it is not drawn from a stirred tank reactor and thus not subject to declining concentrations. FIG. 1 shows an exemplary hypothetical polarization curve of a fuel cell having a conventional configuration. As more power is taken from the system, the output voltage increases due to the impedance of reactant ion migration by the product ion migration in the diffusion later. Similarly, FIG. 2 shows the power output of discharging primary batteries. Ere, as the battery or cell of a battery discharges, the voltage falls and the current declines, plotted as voltage in this case, as the reactants are depleted. The sharp decline at the beginning of the discharge represents the loss or dilution of reactants at the interface as the reaction proceeds and the establishment of the Nernst diffusion layer at the electrode electrolyte boundary. This can be slowed by increasing mixing of the bulk of the electrolyte in a redox cell, which has been observed experimentally with numerous redox type reactions. The subsequent slower decline during discharge of the battery is due to the declining concentration of the reactants available to support the discharge.

This decline in performance over time is observed in most battery and fuel cell systems and presents a problem for the user and operator of the device. Discharge rates are often set to minimize these effects. For electrical power users, power companies, vehicle, and electronic device operators, a constant performance until the battery is completely discharged is desirable but rarely delivered. For example a combustion engine-driven vehicle is required to use its fuel on the basis of "good-to-the-last-drop". However, this is not the case for a typical battery powered vehicle using conventional battery technology as power fade is a real problem. Even where redox flow batteries are employed, single pass performance is not achieved. However, where a long skinny flow path is employed, a true single pass liquid battery can be realized.

In fuel cells, the ability to consume all the fuel is very important. For example, when the electrode runs out of fuel at a current density that is too high, areas of the electrode will become resistors, or worse, start operating with alternative reactions. In some instances, cells will even reverse polarity when fuel starved in a cell stack with subsequent damage to the electrodes. A further problem occurs when incomplete consumption of the fuel occurs due to suboptimal operation to avoid fuel starvation. Thus, the ability to tune the conditions in a cell is a great advantage instead of relying on the generation of high mass transfer conditions and high mechanical pumping losses associated with these stratagems. The reverse problem exists with charging secondary batteries. A fully discharged battery will generally accept a much higher charging rate as the spent reactants are at their maximum concentration. Thus, when a battery is close to a fully charged state, high charging rates promote unwanted side reaction such as gas evolution.

In contrast, the inventor implemented significant changes in the geometry and functionality of electrochemical devices to thereby change the mode of operation to a true single pass device. For example, in one version of contemplated devices and methods, long narrow channels are used for the passage of the electrolyte. In doing so, turbulent flow in the electrolyte is eliminated. Still further, fresh electrolyte is fed on a one-pass basis to the electrodes and the electrolyte is substantially completely consumed or used to generate active species during the single passage through the cell.

In one exemplary configuration of a "good-to-the-last-drop" device, fresh and spent electrolytes are contained in separate containers. On charging the cell, spent electrolyte is fed into the channels, on discharge the flow is reversed along with the direction of the electrical charge using single-pass conditions. In such configurations and methods, the device is operating at its maximum performance under all circumstances. A further benefit is obtained by the rate at which the electrolyte is fed to the channel as that rate will increase the energy of the discharge (useful for acceleration) or charge (useful for braking). The advantages of such concept are readily apparent in the case of a battery on hybrid vehicles. The ability to apply maximum power for acceleration and adsorb power during braking can be accommodated at any point in the cycle. Likewise, this ability is of great importance in power conditioning at large utilities.

Figure 3:
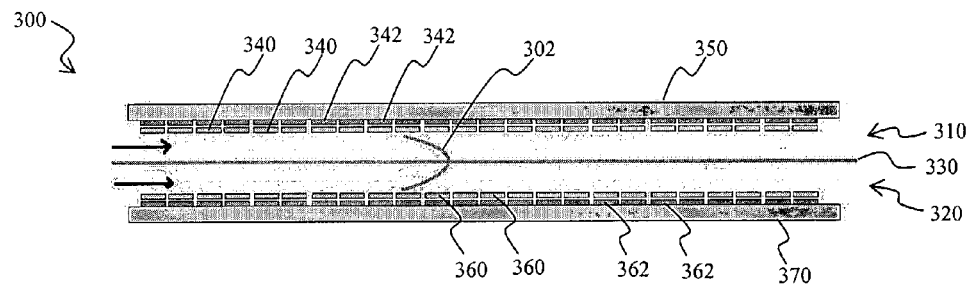
FIG. 3 is an exemplary configuration of one segmented electrode and electrolyte conduit according to the inventive subject matter.

A typical configuration for a simple cell is depicted in the schematic illustration of FIG. 3 in which cell 300 has first and second electrolyte flow channels 310 and 320 that are separated by separator 330. The arrows indicate flow of the electrolyte, and spent/fresh electrolyte front 302 is indicated as a curved line. The electrolyte in channel 310 is in contact with electrode surface elements 340, which are in turn in electric contact with flow control elements 342, respectively. The flow control elements 342 are then coupled to the bus bar 350. In the opposite side of the cell, the electrolyte in channel 320 is in contact with electrode surface elements 360, which are in turn in electric contact with respective flow control elements 362, which are then coupled to the bus bar 370. Such embodiments provide a conceptually very simple configuration that requires no complicated control system as the diodes are a passive control devices allowing electron flow in only one direction. Of course, it should be noted that the anode and cathode diodes need to be pointing in the same direction to allow proper operation.

Figure 4:
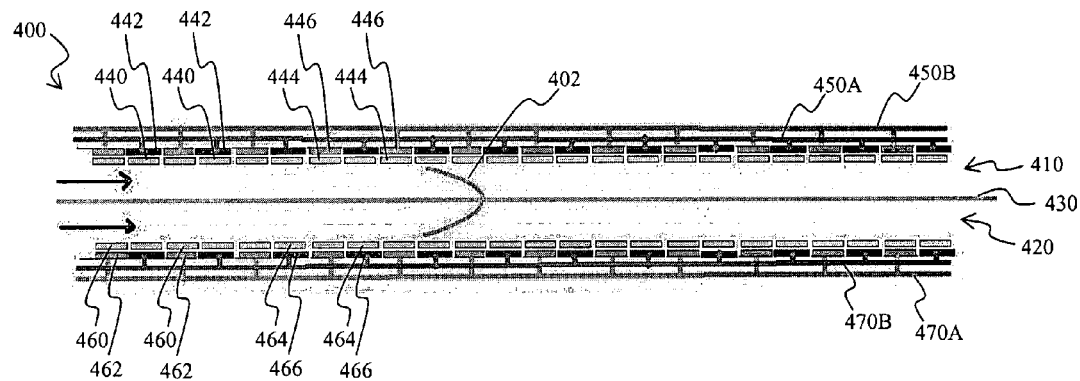
FIG. 4 is an exemplary configuration of another segmented electrode and electrolyte conduit according to the inventive subject matter.

It should further be recognized that the above system can be easily changed by adding to a single electrode further electrode segments and diodes coupled thereto, this time with the additional diodes pointing in the opposite direction so that the electrode can be switched from reduction mode to oxidation mode simply by turning off the reduction circuit and turning on the oxidation circuit, and by reversing the flow of the electrolyte. Where the device is a secondary battery, the charge/discharge mode can be switched instantaneously together with reversal of the electrolyte flow. In such configurations, a secondary battery can be employed in an electric vehicle where the battery can act as the load or break to slow the vehicle, and wherein the energy from the breaking can be put back into the unused electrolyte tank. One such exemplary configuration is schematically illustrated in FIG. 4. Here, a secondary battery cell 400 has first and second electrolyte flow channels 410 and 420 that are separated by separator 430. As above, the arrows indicate flow of the electrolyte and 402 denotes the fresh/spent electrolyte front. However, it should be noted that the flow direction in such cell can be reversed. The electrolyte in channel 410 is in contact with first electrode surface elements 440, which are in turn in electric contact with first flow control elements 442, respectively. The electrolyte in channel 410 is also in contact with second electrode surface elements 444, which are in turn in electric contact with second flow control elements 446, respectively. First flow control elements 442 are then coupled to the first (charge) bus bar 450A, while second flow control elements 446 are coupled to the second (discharge) bus bar 450B. In the opposite side of the cell, electrolyte in channel 420 is in contact with first electrode surface elements 460, which are in turn in electric contact with first flow control elements 462, respectively. The electrolyte in channel 420 is also in contact with second electrode surface elements 464, which are in turn in electric contact with second flow control elements 466, respectively. First flow control elements 462 are then coupled to the first (charge) bus bar 470A, while second flow control elements 466 are coupled to the second (discharge) bus bar 470B.

Figure 5:
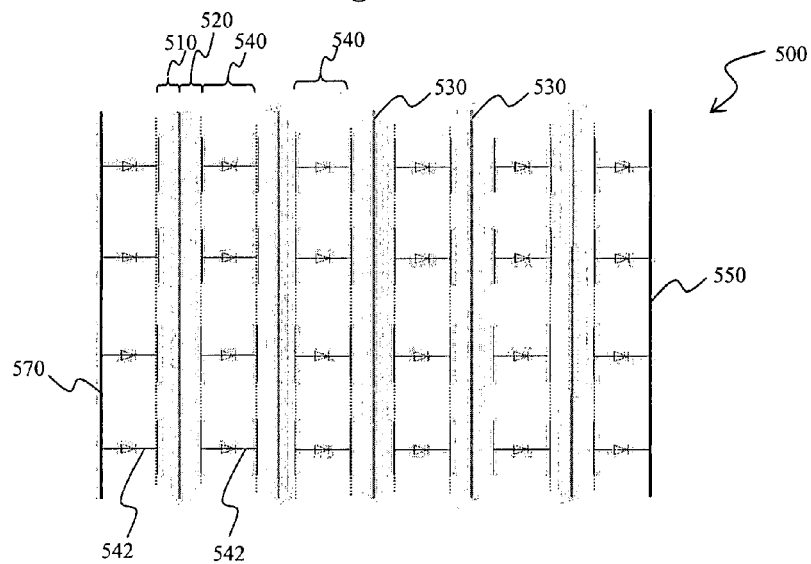
FIG. 5 is an exemplary configuration of one bipolar segmented electrode and electrolyte conduit according to the inventive subject matter.
Figure 6:
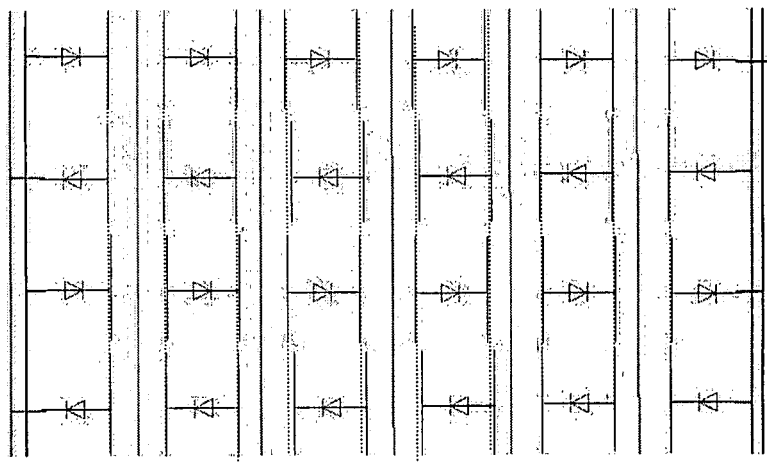
FIG. 6 is an exemplary configuration of another bipolar segmented electrode and electrolyte conduit according to the inventive subject matter.

In still further contemplated aspects, thin bipole electrodes can be manufactured (e.g., using surface mount technology) that have one diode between the anode on one side and the cathode on the other as schematically depicted in the exemplary configuration of FIG. 5. Here, device 500 comprises bus bars 550 and 570 and a plurality of bipolar electrodes 540 that include a current control element 542. Separators 530 complete the formation of anode and cathode compartments 510 and 520, respectively. FIG. 6 depicts a similar exemplary configuration as shown in FIG. 5, but now with bipolar electrodes in which the some of the segments of the electrode have diodes (or other control elements) with a polarity opposite of other segments of the same bipolar electrode. It should be noted that the direction of diodes in each charge/discharge circuit is different, and that the device will have two bus bars per end. Therefore, it should be appreciated that charging and discharging configurations on the same electrode can be implemented in a manner similar to that of FIG. 4, however, now in a bipolar configuration. Where the electrolyte conduits are stacked into a cell that has bipoles with diodes, devices are contemplated in which a plurality of parallel electrolyte conduits are separated by a plurality of separators, and a plurality of bipolar diode-containing electrodes are included to form a block of multiple and parallel bipolar cells in which bus plates provide the ends of the device.

Therefore, it should be recognized that electrochemical cells can be prepared that allow for substantially complete exhaustion (i.e., at least 85%, more typically at least 90%, most typically 95%) of the reactants in the electrolyte in a single pass. As this reactor would typically have relatively long flow paths for the electrolyte, the addition of diode controlled current distribution will advantageously ensure power control beyond that provided by the pump rate. Single pass electrochemical reactions are especially useful as they save energy and simplify process control. For example, in contemplated devices and methods, the pumping energy for electrolyte recirculation is reduced, and the cell voltage is no longer strictly a function of electrolyte resistance and inter-cell gap. Moreover, due to the use of current control elements, heat production is reduced and current efficiency towards the end of the reaction is increased. Among other remarkable properties of contemplated devices, it should be appreciated that the segmented electrode changes the redox state of substantially all of the electrolyte downstream of the flow path and thus provides a single-pass reactor. Viewed from another perspective, one end of the flow path may be fluidly coupled to a first electrolyte tank and the other end of the flow path may be fluidly coupled to a second electrolyte tank, wherein substantially all of the electrolyte in the first tank has a first redox state and wherein substantially all of the electrolyte in the second tank has a second redox state.

With respect to suitable electrolyte conduits it should be appreciated that all shapes and dimensions are deemed suitable for use herein, so long as such shapes provide for a laminar flow of the electrolyte in the conduit, most preferably such that the boundary layers collapse on each. Viewed from another perspective, suitable electrolyte conduits will allow for a single pass oxidation or reduction of substantially all of the active species in the electrolyte. Therefore, contemplated conduits may have numerous shapes, and lengths, including those with square or rectangular cross section, rounded cross section, and even irregular cross section. However, it is generally preferred that the conduits have a rectangular vertical cross section and a depth (distance between separator and electrode face) of equal or less than 10 mm, more typically equal or less than 5 mm, and most typically equal or less than 2 mm, and a width (side-to-side distance) of equal or less than 5 cm, more preferably equal or less than 2 cm, and most preferably equal or less than 1 cm. Depending on the electrolyte concentration, flow rate, and other parameters, the length of suitable channels may vary considerably. Most preferably, the conduits will be configured as long channels with a length-to-depth ratio is at least 30, more typically 100, most typically 500, and even more. Still further, and especially where multiple conduits are present, the conduits may be arranged in form of a massively parallel block of channels, typically in conjunction with a with a bipolar electrode assembly.

Depending on the specific configuration of the electrolyte conduit, it should be noted that the active surface geometry of the electrode segments may vary considerably. Thus, suitable geometries include geometric (e.g., rectangular, square, round, elliptical, etc) and random shapes. However, it is generally preferred that the electrode segments will have a rectangular or square shape. Most typically, the segments will have the same dimensions, and there will be at least two, more typically three to ten, and even more typically between 10 and 100 (and even more) segments per conduit. Similarly, it is preferred that there is only a single segment at the same flow distance (as measure from the end of the conduit), however, multiple segments are also contemplated.

The segments are typically insulated from neighboring segments by either insulating material or simply by providing sufficient space between the segments. With respect to the material of the segments it is generally contemplated that the choice of the specific material will depend in large degree on the particular electrochemical reaction and may therefore vary considerably. However, especially preferred materials include all known metals and metal alloys suitable for use in an electrode as well as metal oxides (e.g., iridium oxide, titanium oxide and suboxides, etc.) and all reasonable combinations thereof. The segments may be coupled directly to a carrier that has an individual conductor connecting the segment to a bus or sub-bus, or may be indirectly coupled to the carrier via an intermediate and conductive material (e.g., conductive polymer). Regardless of the manner of coupling, it is generally preferred that individual segments (or small groups of segments) are electrically coupled to a current collector or distributor (bus or sub-bus) via one or more current control devices. Thus, it is contemplated that a segment plus a current control device may form an electrode panel, which may even have bipolar configuration.

With respect to contemplated current control devices, it should be noted that all devices are deemed suitable that allow controlled application of current to one or more predetermined segments. Consequently, mechanical switches or timed switches (preferably coupled to the flow rate), and especially electronic switches (most preferably semi-conductor) are deemed suitable. For example, especially preferred current control devices include diodes (e.g., regular diode or switching diode), transistors, and integrated circuits. Among other advantages, it should be appreciated that such electronic switches will not only allow for automatic opening and closing of the circuit to the segment, but also to modulate the switching characteristics (especially where transistors or integrated circuits are used).

While there are numerous manners of electrically coupling the current control device to an electrode segment, it is generally preferred that the current control device is between the segment and the current collector/distributor. For example, surface mount technology will allow direct coupling of the current control device to the segment and the collector/distributor structure. On the other hand, suitable current control devices may also be wired to at least one of the segment and collector/distributor to allow for simple replacement or integration to other electronic devices. Moreover, it is further contemplated that at least two of the current control devices may be coupled to each other. For example, neighboring diodes can be coupled to each other to provide neighboring bias. On the other hand, current control device may be coupled to each other via a microprocessor to control or fine-tune electrode surface characteristics control. Therefore, a current control device can be configured to allow individual control of flow of current in the segment to thereby allow control of current to different parts of the flow path of the electrolyte.

Additionally, it should be appreciated that contemplated electrodes as well as conventional electrodes in electrochemical reactors (e.g., plating devices) and batteries can be configured such that the cell gap between the cathode and anode will be variable to allow adjustment/maintenance of a predetermined gap width (or width range). The adjustment of the gap can be performed in numerous manners and may be controlled, for example, by the amount of current delivered through the electrode or segment, by plating or discharge time, etc. For example, movable electrodes and/or electrode segments will continuously fine tune metal recovery systems to best plating conditions as a constant gap width is maintained to allow metal deposition without membrane damage or cell shorting. Similarly, batteries that use metal to ionic conversion can significantly benefit from configurations in which the cell gap is maintained at a predetermined gap width (or width range) as the electrodes will go toward the membrane as the metal is depleted.

Contemplated configurations and methods can be implemented in numerous devices and methods, and it is generally contemplated that all devices with an electrode are deemed suitable for use in conjunction with the teachings presented herein. For example, especially contemplated devices include primary batteries, secondary batteries, fuel cells, devices for water treatment (and especially sterilization), synthetic reactors in which at least one product is electrochemically generated, etc. For example, in the case of water sterilization of drinking water, the benefits of using contemplated configurations and methods are substantial as one of the biggest problems is the low conductivity of water to be treated. Similarly, in the case of redox flow batteries and fuel cells, single pass "good-to-the-last-drop" use of electrolyte and simple flow reversion substantially simplifies the system for on-vehicle control. Still further contemplated systems include water sterilization by oxidation, flow batteries using soluble redox ions with multiple valence states, fuel cells, drug delivery systems, electrochemical synthesis, and electrochemically aided biosynthesis.

Thus, specific embodiments and applications of compositions and methods related to electrochemical devices have been disclosed. It should be apparent, however, to those skilled in the art that many more modifications besides those already described are possible without departing from the inventive concepts herein. The inventive subject matter, therefore, is not to be restricted except in the spirit of the present disclosure. Moreover, in interpreting the specification and contemplated claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. An electrochemical device comprising an electrolyte conduit having a length-to-depth ratio of at least 30 that is configured for laminar flow of at least 85% of an electrolyte flowing along the conduit, and further comprising a plurality of neighboring electrode segments that run along the length of the conduit, wherein the electrode segments are electrically insulated from each other, wherein the electrode segments are arranged for sequential contact of the electrolyte with the electrode segments, and wherein at least two of the electrode segments are electronically coupled to at least two respective current control devices.

2. The electrochemical device of claim 1 wherein the conduit is configured as a linear conduit, and wherein the plurality of neighboring electrode segments comprises at least 10 electrode segments.

3. The electrochemical device of claim 1 wherein the current control devices are selected from the group consisting of a diode, a transistor, and an integrated circuit.

4. The electrochemical device of claim 1 wherein the current control devices are disposed between an electrode surface and a busbar.

5. The electrochemical device of claim 1 wherein the current control devices are electronically coupled to each other to provide a neighbor bias.

6. The electrochemical device of claim 1 wherein the electrode segments are configured to allow control of current to different parts of the flow path.

7. The electrochemical device of claim 1 wherein the segmented electrode is a compound electrode that is configured such that one of the at least two segments is operable as a cathode and the other of the at least two segments is operable as an anode.

8. The electrochemical device of claim 1 further comprising at least one of a transistor, an integrated circuit, and a microprocessor, coupled to control at least one of voltage and current at the at least two of the segments.

9. The electrochemical device of claim 1 further comprising a separator that is configured to define at least part of the electrolyte conduit.

10. The electrochemical device of claim 9 further comprising a second electrolyte conduit that is configured such that at least 85% of a second electrolyte flowing through the second conduit has a laminar flow, and a second segmented electrode in contact with the second electrolyte, wherein at least two of the segments of the second segmented electrode are electronically coupled to at least two respective second current control devices, and wherein the at least two of the segments have opposite polarity.

11. An apparatus comprising the device of claim 1, wherein the apparatus is selected from the group consisting of a primary battery, a secondary battery, a fuel cell, and an electrochemical reactor.

12. A method of operating an electrochemical device comprising:
pumping an electrolyte having a first oxidation state along a flow path having a length-to-depth ratio of at least 30, wherein the flow path comprises a plurality of neighboring electrode segments that run along the length of the flow path and are arranged for sequential contact of the electrolyte with the electrode segments, and wherein the flow path is configured such that at least 85% of the electrolyte has laminar flow in the flow path;
wherein the electrode segments are electrically insulated from each other; and
changing the first oxidation state of the electrolyte to a second oxidation state on the electrode segments in the flow path such that at least 85% of the electrolyte has the second oxidation state at a location downstream of the flow path.

13. The method of claim 12 wherein at least two of the segments of the electrode are electronically coupled to at least two respective current control devices.

14. The method of claim 13 wherein the current control devices are selected from the group consisting of a diode, a transistor, and an integrated circuit.

15. The method of claim 13 wherein the current control devices are disposed between an electrode surface and a busbar.

16. The method of claim 12 wherein the electrochemical device is a primary battery, a secondary battery, a fuel cell, or an electrochemical reactor.

17. A method of manufacturing an electrochemical reactor having a first electrolyte reservoir with a first electrolyte at a first oxidation state, a second electrolyte reservoir with the first electrolyte at a second oxidation state, and an electrolytic cell having an anode, a cathode, and a separator between the anode and the cathode, wherein the cell has a flow path that fluidly couples the first and second electrolyte reservoirs, and wherein the flow path allows the first electrolyte to contact the anode, the method comprising the steps of:
forming a length of the flow path between the first and second electrolyte reservoirs as a flow path having a length-to-depth ratio of at least 30 such that at least 85% of the first electrolyte has a laminar flow in the flow path along the length of the flow path; and
forming the anode from a plurality of neighboring electrode segments that are electrically insulated from each other in the flow path such as to allow change of oxidation state of at least 85% of the first electrolyte from the first to the second oxidation state upon traversing the length of the flow path.

18. The method of claim 17 wherein the step of forming the anode comprises a step of segmenting the anode into a plurality of segments, and coupling at least two of the segments to at least two respective current control devices.

19. The method of claim 18 wherein the current control devices are selected from the group consisting of a diode, a transistor, and an integrated circuit.

20. The method of claim 17 wherein the step of forming the length of the flow path comprises forming of a linear conduit having a length and a depth, wherein the length-to-depth ratio is at least 30.

* * * * *